Sept. 10, 1968 J. D. LEA 3,401,268

OPTICAL CORRELATOR UTILIZING A PLURALITY OF AXIALLY ALIGNED PHOTOCHROMIC DISKS

Filed Sept. 10, 1965 2 Sheets-Sheet 1

INVENTOR.
JOHN D. LEA
BY S. C. Yeaton
ATTORNEY

Sept. 10, 1968 J. D. LEA 3,401,268

OPTICAL CORRELATOR UTILIZING A PLURALITY OF AXIALLY ALIGNED PHOTOCHROMIC DISKS

Filed Sept. 10, 1965 2 Sheets-Sheet 2

INVENTOR.
JOHN D. LEA
BY
S. C. Yeaton
ATTORNEY

United States Patent Office 3,401,268

Patented Sept. 10, 1968

3,401,268

OPTICAL CORRELATOR UTILIZING A PLURALITY OF AXIALLY ALIGNED PHOTOCHROMIC DISKS

John D. Lea, Huntington Station, N.Y., assignor to Sperry Rand Corporation, a corporation of Delaware Filed Sept. 10, 1965, Ser. No. 486,426
10 Claims. (Cl. 250—219)

This invention relates to a signal correlator and more specifically to a device for correlating digitally coded information.

Data processing systems often require that input signals from two different channels be correlated. For instance, situations arise in which a complex signal is to be detected at two different points in space and the difference in signal arrival time between these points must be determined. A problem arises if the signal is propagated in a noisy environment since it becomes difficult to distinguish between the signal and the background noise. Correlation techniques in which known delays are applied to the earlier received signal are commonly employed in the situations.

Optical correlators have been devised for this purpose. These devices, however, use analog inputs and integrate optically recorded data by correlating the signals over a large time segment. The entire process of correlation in these devices is carried out optically. In such devices the recording medium must be uniform in density and the readout means must provide a light source of exceptionally uniform intensity. If either of these values is not uniform, the enhancement in signal-to-noise ratio provided by the correlator will be limited by the correlator instrumentation and not by the noise background.

Electronic correlators are known in the prior art in which two trains of digital signals are fed to separate shift registers. The signals are shifted digit-by-digit with respect to each other and the correlation at each digit position is indicated.

These electronic correlators, however, require an excessively large number of components so that they become expensive and unwieldy.

It is an object of the present invention to provide a correlation device that is relatively simple and inexpensive to fabricate.

It is another object of the present invention to provide a correlation device that may be used with digital input signals and is capable of producing correlation data for each digit position in a word to be considered.

These and other objects are achieved by providing optical means to compare each digit in one word to be correlated with each of the digits in the other word to be correlated and by providing electrical means to indicate the total number of correlations occurring at each digit position during the comparison cycle.

The principles and operation of the invention may be understood by referring to the following description and the accompanying drawings.

Figure 1:
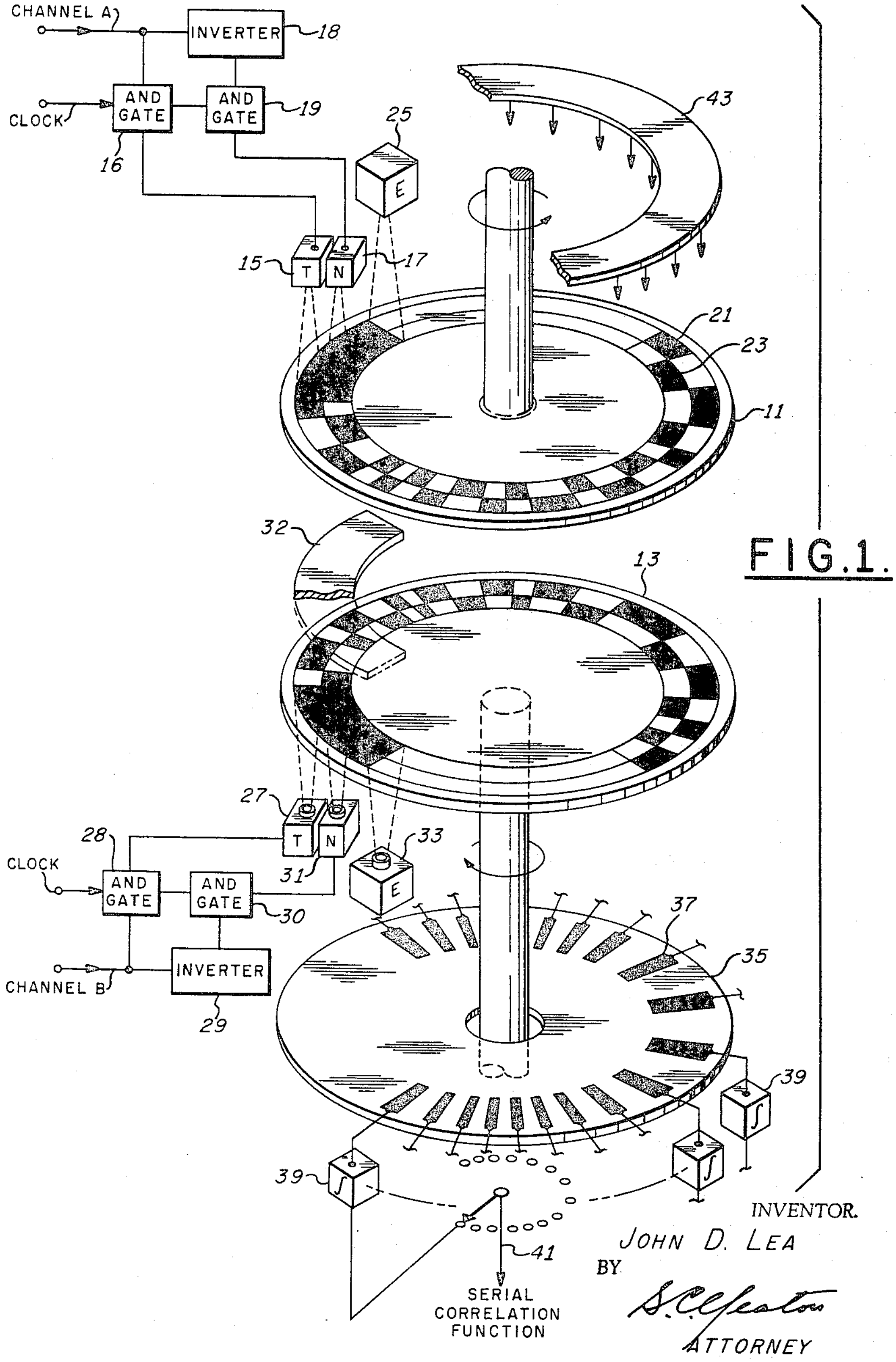
Figure 2:
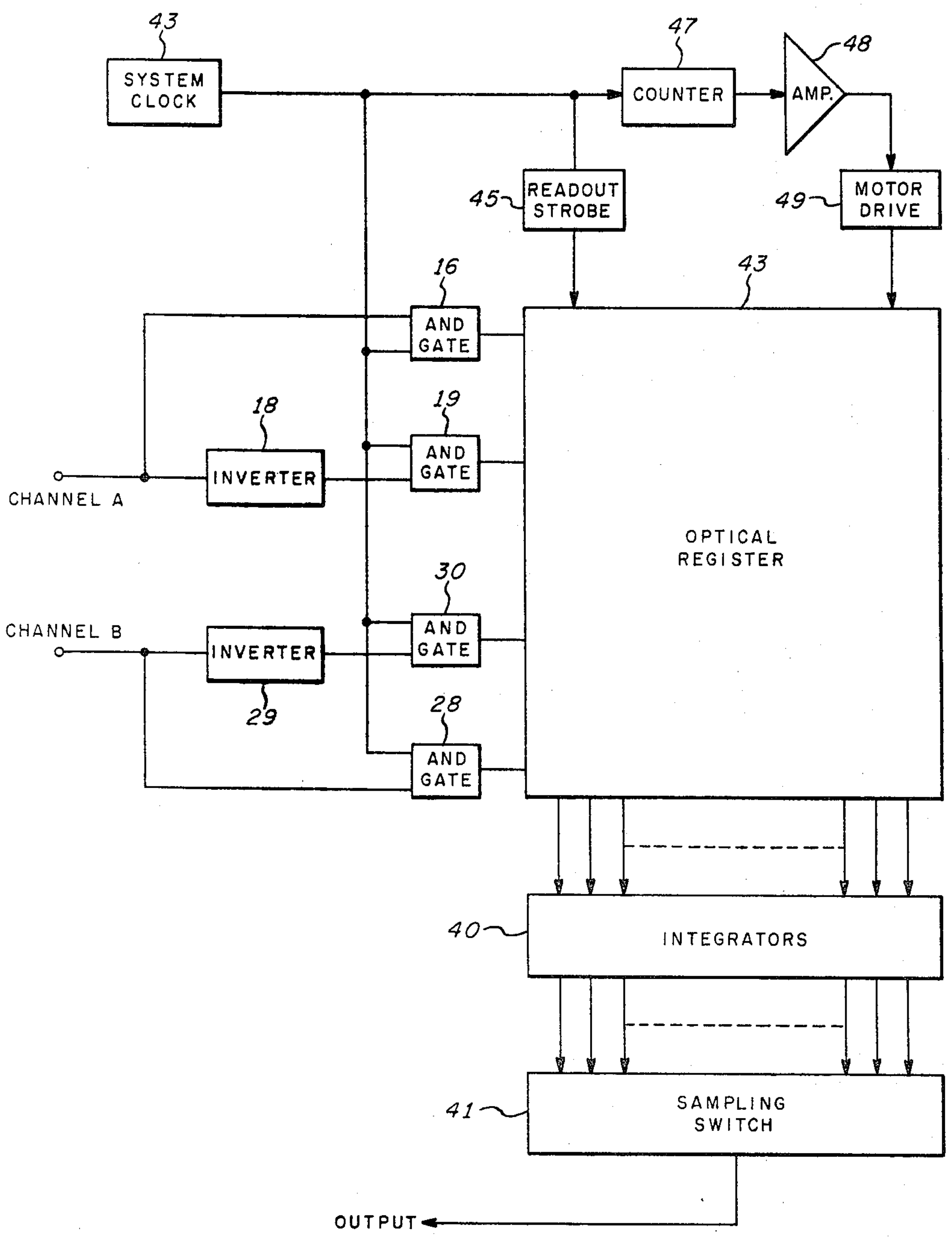

FIG. 1 is an exploded perspective view, partly in block form, illustrating a presently preferred embodiment of the invention, and FIG. 2 is a block diagram useful in explaining the operation of the invention.

The invention depends for its operation upon the characteristics of known photochromic materials. These materials contain molecules that can exist in any one of several states. In a first state, the molecules are arranged in such a way that the material becomes transparent. Light of a proper wavelength, such as ultraviolet light, will excite the molecules into a second state in which the material becomes opaque. Light of a second wavelength, such as yellow or red light, will cause the molecules in the second state to revert to the first state so that the material again becomes transparent. Light of a third wavelength, such as green light, can be used to read out the patterns on the photochromic material without affecting the opacity of the material.

In embodiments of the present invention, the photochromic material is applied to a suitable transparent supporting or backing material to provide a photochromic record means on which the incoming signals may be recorded as a pattern of transparent and opaque areas.

In FIG. 1, a photochromic material is applied to transparent rim portions of a first photochromic disk 11 and a second photochromic disk 13. A first train of digitally coded signals is received in channel A. These signals are applied to a TRUE light modulator 15 through an AND gate 16, and to a NOT light modulator 17 through an inverter 18 and an AND gate 19. The TRUE and NOT light modulators produce light beams which are modulated in accordance with the signals applied to their inputs. Thus a given signal on channel A, when accompanied by a strobe pulse, will produce a light beam at the modulator 15 or the modulator 17 depending upon the nature of the applied signal.

The photochromic material is applied to the disk 11 in two concentric tracks 21 and 23. The material in the outer track 21 is applied in such a position that rotation of the disk 11 will expose successive elemental areas in this track to the modulated light output from the TRUE modulator 15. The photochromic material on the inner track 23 is applied in such a position that rotation of the disk 11 will expose successive elemental areas in this track to the modulated light output from the NOT modulator 17. An ERASE means 25 is arranged to flood the successive areas in the two tracks of photochromic material with light of a suitable wavelength to restore the photochromic materials to their opaque condition just before the material is exposed to the WRITE beams from the two modulators.

The photochromic disk 13 is also provided with a pair of concentric tracks. These tracks are similar to those applied to the first photochromic disk 11.

A second digitally coded signal train arriving in channel B is applied to a TRUE light modulator 27 through an AND gate 28. The same signal train is applied through an inverter 29 and an AND gate 30 to a NOT light modulator 31. Modulated light beams from the modulators 27 and 31 are focussed on the outer and the inner tracks of the photochromic material respectively.

The light beams produced by the modulators are of such a wavelength that exposure to these beams causes the photochromic material to become transparent. Thus a received signal causes an elemental area in either the outer or the inner tracks of the appropriate disk to become transparent and permits the corresponding area in the second track of the same disk to remain opaque. In this way, a complementary coded digital signal is recorded on each disk.

A source of ERASE light 33 is positioned near the modulators 27 and 31 so that successive areas in the paths of photochromic material are returned to the opaque state just before those areas are exposed to the modulated WRITE light from the sources 27 and 31.

An opaque shield 32 confines WRITE light from the various modulators to the appropriate photochromic disk.

A readout disk 35 is positioned below the two photochromic disks. The readout disk contains a plurality of radially disposed photocells 37. The cells are sufficiently long so that they receive light passing through either track of photochromic material. An output signal from any of these photocells is fed to the appropriate one of the individual integrating means 39. Each of these integrating means is connected to a given terminal on a sampling switch 41.

A source of READ light 43 is positioned over the first photochromic disk 11 so as to provide a substantially uniform light which can be transmitted through the two photochromic disks and on to the readout disk. The readout disk serves as a READ light collecting means.

Although shown only in schematic form in the drawing, the source of READ light extends through the readout region of the photochromic disks: that is, an arc such that a portion of the photochromic material just leaving the area of the modulated WRITE beams can be flooded with READ light until a time just before that same portion of photochromic material is exposed to the ERASE light. The READ light source is chosen to produce light of a wavelength that will not affect the opacity of the photochromic material.

The two photochromic disks are arranged to rotate at the same speed but in opposite directions. The readout disk is stationary so that each of the photocells on this disk represents a given point in the readout region.

The integrating means 39 serve to add the individual signals received by each photocell during a complete revolution of either of the photochromic disks and to provide an output signal indicative of the total signal received by the photocell during this interval.

The sampling switch 41 is actuated after a complete cycle of the photochromic disks so as to indicate the total signal applied to each integrator in turn.

The photochromic disks, the readout disk, and the various light sources constitute an optical register in which information can be temporarily stored during processing.

The function of the optical register in an entire correlation system can be better visualized by referring to FIG. 2 wherein incoming digitalized signals arriving in channels A and B are applied to an optical register 43 through the appropriate inverters and AND gates. The electrical output signals from the optical register are individually integrated in the bank of integrators 40 and applied to the sampling switch 41.

A system clock 43 is used to synchronize the various components in the entire system. The signals from the clock are applied to the various AND gates so as to permit input signals to be applied to the WRITE light modulators at appropriate times. The clock signals are also applied to a readout strobe 45 which pulses the READ light source in synchronism with the WRITE beams. Strobing the various light sources in this manner provides not only synchronization but also desired pulse shaping.

The clock signals are also applied through a counter 47 and an amplifier 48 to a synchronized motor drive 49. This drive rotates the photochromic disks in synchronism with the clock pulses.

When the correlator is first put in operation, the ERASE means flood the various photochromic tracks leaving the material in these tracks in an opaque state. When a signal is to be recorded, the coincidence of such a signal with a strobe pulse from the system clock permits a WRITE beam to be generated by the appropriate modulated light source.

To understand the operation of the correlator, first consider a situation in which there is no delay in either received signal. The same signal will then be applied simultaneously to both channels. Information from channel A will be written into the photochromic material in disk 11 at the same time that the information is written into the photochromic material on disk 13. Since these disks rotate at the same speed but in the opposite directions, each corresponding bit of the records on the two disks will become aligned at a point displaced 180° from the WRITE light sources. When the READ light source 43 is strobed, the light will be transmitted through either the inner or the outer tracks on the two photochromic disks and will be intercepted by the particular photocell that is displaced 180° from the WRITE light sources. This particular photocell will receive a burst of light for each bit recorded.

Since corresponding bit positions on the two disks will be aligned at only this one point as the disks rotate, the remaining photocells will receive bursts of light only when two different bits in the two received signals happen to have the same binary value. It can be shown that this will occur in less than all of the attempted individual comparisons for the remaining photocells. After integration, only a signal position associated with the 180° photocell will display a maximum value for the condition in which neither signal is delayed before reception.

If, now, reception of the signal in channel A is delayed with respect to reception of the signal in the channel B, corresponding bits recorded on the two disks will be aligned at a point at which the photochromic disk 13 associated with channel B has rotated 180° plus some increment and the photochromic disk 11 has rotated 180° minus the same increment. The magnitude of this increment will be determined by the amount of the delay.

In this instance, of course, the particular photocell located beneath the aligned corresponding bits will receive a burst of light for each digit whereas all other photocells will receive bursts of light only when two noncorresponding bits happen to have the same binary value.

If the situation is reversed so that reception of the signal in channel B is delayed with respect to reception of the signal in channel A, corresponding bits recorded on the two photochromic disks will be aligned when the photochromic disk 11 associated with channel A has rotated more than 180° and the disk 13 has rotated less than 180°.

Thus it can be seen that one particular photocell will receive a maximum number of bursts of READ light during a given correlation cycle and the identity of this cell is a direct indication of the magnitude and sense of the signal delay which is to be measured.

Operation of the sampling switch can be used to detect the particular integrator that has stored the maximum accumulated signals.

In some instances, variable amplitude signals rather than digitally coded signals are received. In this case, it is possible to clip these signals and then apply the clipped signals to the two channels of the correlator. The signals applied to the correlator in these circumstances consists of variable length pulses of constant amplitude. The strobe means serves to chop these pulses into groups of uniform amplitude pulses equivalent to digitally coded pulses.

Although the readout disk containing a photocell for each bit position is presently preferred, it is possible to use a circular scan vidicon for this purpose. A maximum indication will still be obtained at the points of rotation corresponding to the delay to be measured.

The description has been limited to a device in which a WRITE light converts the photochromic material to a transparent state and an ERASE light converts the material to an opaque state. This mode of operation could be reversed if desired. In such an environment, the integrator having no accumulated signal at the end of a cycle would indicate the delay to be measured.

The record means and the collecting means have been illustrated as the disks 11, 13, and 35 respectively. However, it will be realized that many variations of these particular embodiments may be employed.

The disks need not be concentrically aligned, for instance, so long as the READ light is passed serially through the two record means and on to a collecting means.

In some applications, concentric drums or endless belts might be preferred as record means. In all cases, the relative motion of the two record means must be such that each bit of information recorded on one record means must be aligned in the READ beam with each bit of information recorded on the other record means at some time during a correlation cycle.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A signal correlator comprising first and second photochromic record means; a pair of tracks of photochromic material on each of said record means; means to move said record means so that each elemental area in a track on one record means scans each elemental area in the corresponding track on the other record means; first and second modulating means to provide complementary coded digital WRITE light beams in response to first and second input signal trains to be correlated, said first and second modulating means being arranged to focus WRITE light beams on the tracks of photochromic material on said first and second record means respectively; means to transmit a READ light serially through areas of both record means; collecting means positioned to receive the READ light passing through said record means; and means to compare the individual total quantities of READ light reaching individual sectors of the collecting means during a correlation cycle.

2. A signal correlator comprising first and second photochromic record means; means to move one record means with respect to the other; a pair of tracks of photochromic material on each record means, said tracks being disposed so that each track remains aligned with the corresponding track in the other record means during relative motion of the first and second record means; means to receive first and second signal trains to be correlated; first and second modulated means to provide complementary coded digital WRITE light beams indicative of the first and second received signal trains respectively, said first and second modulated means being arranged to focus the WRITE light beams on the tracks of photochromic material on said first and second record means respectively; means to transmit a READ light serially through the areas of both record means on which a signal has been recorded; collecting means positioned to receive the READ light passing through said record means; and means to compare the individual total quantities of READ light reaching individual sectors of the collecting means during a correlation cycle.

3. A signal correlator comprising first and second photochromic disks; means to rotate one disk with respect to the other; inner and outer annular tracks of photochromic material on each disk; means to receive first and second signal trains to be correlated; means to record complementary coded digital signals representative of the first and second received signal trains on the annular tracks of said first and second disks respectively; means to transmit a READ light serially through the areas of both disks on which a signal has been recorded; a readout disk positioned to receive the READ light passing through said photochromic disks; and means to compare the individual total quantities of READ light reaching individual sectors of the readout disk during a correlation cycle.

4. A signal correlator comprising first and second photochromic disks; means to rotate one disk with respect to the other; a pair of annular tracks of photochromic material on each disk; means to receive first and second signal trains to be correlated; first and second modulated means to provide complementary coded digital WRITE light beams indicative of the first and second received signal trains respectively, said first and second modulated means being arranged to focus the WRITE light beams on the tracks of photochromic material on said first and second disks respectively; means to transmit a READ light serially through the areas of both disks on which a signal has been recorded; a readout disk positioned to receive the READ light passing through said photochromic disks; and means to compare the individual total quantities of READ light reaching individual sectors of the readout disk during a correlation cycle.

5. A signal correlator comprising first and second WRITE means to provide digitally coded WRITE light signals in response to first and second received signal trains respectively; first and second rotatable photochromic disks; means to rotate one disk relative to the other; annular tracks of photochromic material on each of said photochromic disks; said first and second WRITE means being arranged to focus WRITE light signals on the annular tracks of said first and second photochromic disks respectively; means to erase information previously recorded in said tracks; means to transmit a READ light serially through the readout regions of both photochromic disks; stationary collecting means to receive the READ light passing through said disks; and means to compare the total quantities of READ light impinging on individual sections of said collecting means during a correlation cycle.

6. A signal correlator comprising first and second axially aligned photochromic disks; means to rotate the disks at the same speed but in opposite directions about their common axis; a pair of annular tracks of photochromic material on each disk; means to receive first and second signal trains to be correlated; first and second modulated means to provide complementary coded digital WRITE light beams indicative of the first and second received signal trains respectively, said first and second modulated means being arranged to focus the WRITE light beams on the tracks of photochromic material on said first and second disks respectively; ERASE means to erase a previously recorded signal from successive elemental areas in the tracks of photochromic material just before these elemental areas are exposed to a WRITE light beam; means to transmit a READ light serially through the overall areas of both disks on which a recorded signal can exist; a readout disk positioned to receive the READ light passing through said photochromic disks; and means to compare the individual total quantities of READ light reaching individual sectors of the readout disk during a correlation cycle.

7. A signal correlator comprising first and second photochromic disks; mechanical means to rotate one disk with respect to the other; a pair of annular tracks of photochromic material on each disk; means to receive first and second signal trains to be correlated; first and second modulated means to provide complementary coded digital WRITE light beams indicative of the first and second received signal trains respectively, said first and second modulated means being arranged to focus the WRITE light beams on the tracks of photochromic material on said first and second disks respectively; ERASE means to erase a previously recorded signal from successive points in the tracks of photochromic material just before these points are exposed to a WRITE light beam; means to transmit a READ light serially through the areas of both disks on which a recorded signal can exist; said mechanical means being arranged to rotate said disks so that each bit of recorded information on one disk is aligned in the READ light beam with each bit of recorded information on the second disk during a correlation cycle; a readout disk positioned to receive the READ light passing through said photochromic disks; and means to compare the individual total quantities of READ light reaching individual sectors of the readout disk during a correlation cycle.

8. A signal correlator comprising first and second photochromic record means; mechanical means to move one record means over the other; a pair of tracks of photochromic material on each record means, said tracks being disposed so that each track remains aligned with the corresponding track in the other record means during relative motion of the first and second record means; means to receive first and second signal trains to be correlated; first and second modulated means to provide complementary coded digital WRITE light beams indicative of the first and second received signal trains respectively, said first and second modulated means being arranged to focus the WRITE light beams on the tracks of photochromic material on said first and second record means respectively; means to transmit a READ light serially through the areas of both record means on which a signal has been recorded; said mechanical means being timed to move the record means so that each bit of information recorded on one record means is aligned in the READ light with each bit of information recorded on the other record means at some time during a correlation cycle; collecting means positioned to receive the READ light passing through said record means; and means to compare the individual total quantities of READ light reaching individual sectors of the collecting means during a correlation cycle.

9. A signal correlator comprising first and second axially aligned photochromic disks; means to rotate said disks at the same speed in opposite directions; inner and outer annular tracks on each of said disks; first and second TRUE modulated WRITE light sources arranged to focus light on aligned points on the outer annular tracks of said first and second disks respectively; first and second NOT modulated WRITE light sources arranged to focus light on aligned points on the inner annular track of said first and second photochromic disks respectively; signal input means to apply a first train of input signals to said first TRUE and said first NOT modulated WRITE sources and to apply a second train of input signals to said second TRUE and said second NOT modulated WRITE sources respectively; ERASE means to erase previously recorded signals on successive portions of said disks just before these portions are exposed to a WRITE light; a source of READ light arranged to illuminate the readout region of the photochromic disks; means to permit operation of the READ and the WRITE light sources only during selected time intervals; means to detect the quantity of READ light passing through individual radial sectors of the two photochromic disks during a correlation cycle; and means to indicate which of said radial sectors passes the largest quantity of light during a correlation cycle.

10. A signal correlator comprising first and second axially aligned photochromic disks; means to rotate said disks at the same speed in opposite directions; inner and outer annular tracks on each of said disks; first and second TRUE modulated WRITE light sources arranged to focus light at aligned points on the outer annular tracks of said first and second disks respectively; first and second NOT modulated WRITE light sources arranged to focus light on aligned points on the inner annular track of said first and second photochromic disks respectively; signal input means to apply a first train of input signals to said first TRUE and said first NOT modulated WRITE sources and to apply a second train of input signals to said second TRUE and said second NOT modulated WRITE sources respectively; ERASE means to erase previously recorded signals on successive portions of said disks just before these portions are exposed to a WRITE light; a source of READ light arranged to illuminate the readout region of the photochromic disks; means to permit operation of the READ and the WRITE light sources only during selected time intervals; a readout disk positioned to receive any READ light transmitted through both photochromic disks; a plurality of photocells radially disposed on said readout disk, each of said photocells being arranged to receive light from radially aligned portions of both annular tracks; individual integrators connected to each photocell; and a sampling switch to connect individual integrators sequentially to a utilization means.

No references cited.

ARCHIE R. BORCHELT, *Primary Examiner.*

T. N. GRIGSBY, *Assistant Examiner.*